US009563687B1

(12) United States Patent
Dutta et al.

(10) Patent No.: US 9,563,687 B1
(45) Date of Patent: Feb. 7, 2017

(54) STORAGE CONFIGURATION IN DATA WAREHOUSES

(71) Applicant: AMAZON TECHNOLOGIES, INC., Seattle, WA (US)

(72) Inventors: Arnab Dutta, Bellevue, WA (US); Ramanathan Muthiah, Issaquah, WA (US); Srinivasan V. Rajagopalan, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 254 days.

(21) Appl. No.: 14/540,648

(22) Filed: Nov. 13, 2014

(51) Int. Cl.
*G06F 17/30* (2006.01)

(52) U.S. Cl.
CPC ... *G06F 17/30592* (2013.01); *G06F 17/30324* (2013.01)

(58) Field of Classification Search
USPC ............... 707/607, 705, 713, 722, 736, 758, 790, 707/802
See application file for complete search history.

(56) References Cited

U.S. PATENT DOCUMENTS

| 7,908,242 | B1 | 3/2011 | Achanta |
| 7,953,698 | B2 | 5/2011 | Beck et al. |
| 8,612,468 | B2 | 12/2013 | Schloming |
| 8,880,506 | B2 | 11/2014 | Chang et al. |
| 9,009,135 | B2 | 4/2015 | Gutlapalli et al. |
| 9,037,609 | B1 | 5/2015 | Tibbitts et al. |
| 9,081,805 | B1 | 7/2015 | Stamen et al. |
| 2003/0228063 | A1* | 12/2003 | Nakayama ............... H04N 1/41 382/251 |
| 2004/0181537 | A1 | 9/2004 | Chawla et al. |
| 2006/0248046 | A1 | 11/2006 | Galindo-Legaria et al. |
| 2013/0173539 | A1 | 7/2013 | Gilder et al. |
| 2013/0254171 | A1 | 9/2013 | Grondin et al. |
| 2014/0143263 | A1 | 5/2014 | Ritter et al. |
| 2014/0172810 | A1* | 6/2014 | Paradies ........... G06F 17/30315 707/705 |
| 2014/0280368 | A1 | 9/2014 | Kemmler et al. |
| 2014/0337373 | A1 | 11/2014 | Morsi et al. |
| 2015/0032684 | A1 | 1/2015 | Gupta |

OTHER PUBLICATIONS

Chau, Dung K., "Final Office Action dated Mar. 11, 2016", U.S. Appl. No. 13/973,324, The United States Patent and Trademark Office, Mar. 11, 2016.
Chau, Dung K., "Non-final Office Action" dated Aug. 27, 2015, U.S. Appl. No. 13/973,324, The United States Patent and Trademark Office, Aug. 27, 2015.

* cited by examiner

*Primary Examiner* — Sana Al Hashemi
(74) *Attorney, Agent, or Firm* — Lindauer Law, PLLC

(57) ABSTRACT

Techniques are described for employing a graph-based analysis to determine a configuration of datasets to be stored on data storage systems in a data warehouse environment. Associations between datasets may be determined based on the parsing of join statements or other types of statements in jobs that are executed on the data storage systems. A graph may be generated that describes the associations among datasets. A greedy breadth-first traversal of the graph may be performed to determine sets of associated datasets. A utilization metric describing a weight of storing the datasets may be determined and employed to identify a data storage system on which to store a set of associated datasets, given the storage and processing capacity of the data storage system.

20 Claims, 11 Drawing Sheets

STORAGE CONFIGURATION IN DATA WAREHOUSES

BACKGROUND

Online businesses and other organizations may store large amounts of data related to their operations. In some cases, an online business may store terabytes, peta bytes, exabytes, or more of data describing products, transactions, customers, vendors, online activities of customers, and so forth. The storage and processing of such a large amount of data may involve a large number of hardware and software resources. In some cases it may be difficult to maintain storage efficiency and processing efficiency as the amount of stored data and the number of resources increase.

Certain implementations and embodiments will now be described more fully below with reference to the accompanying figures in which various aspects are shown. Aspects may be implemented in many different forms and should not be construed as limited to the implementations set forth herein. Like numbers refer to like elements throughout this disclosure.

DETAILED DESCRIPTION

This disclosure describes implementations of systems, devices, methods, and computer-readable media for determining a configuration of datasets stored on data storage systems in a data warehouse environment. In some implementations, a data warehouse environment may include multiple data storage systems. In some cases, each of the data storage systems may comprise a cluster of data storage devices including any number of databases or other types of datastores. The data storage made available by the data storage system(s) may be logically partitioned into any number of portions, and each portion may store data associated with individual(s), a group, a team, a business, or some other organization. Implementations may employ a graph-based analysis to determine an optimal storage configuration to be employed for storing a plurality of datasets (e.g., tables) in the available storage space of one or more portions.

Figure 1:
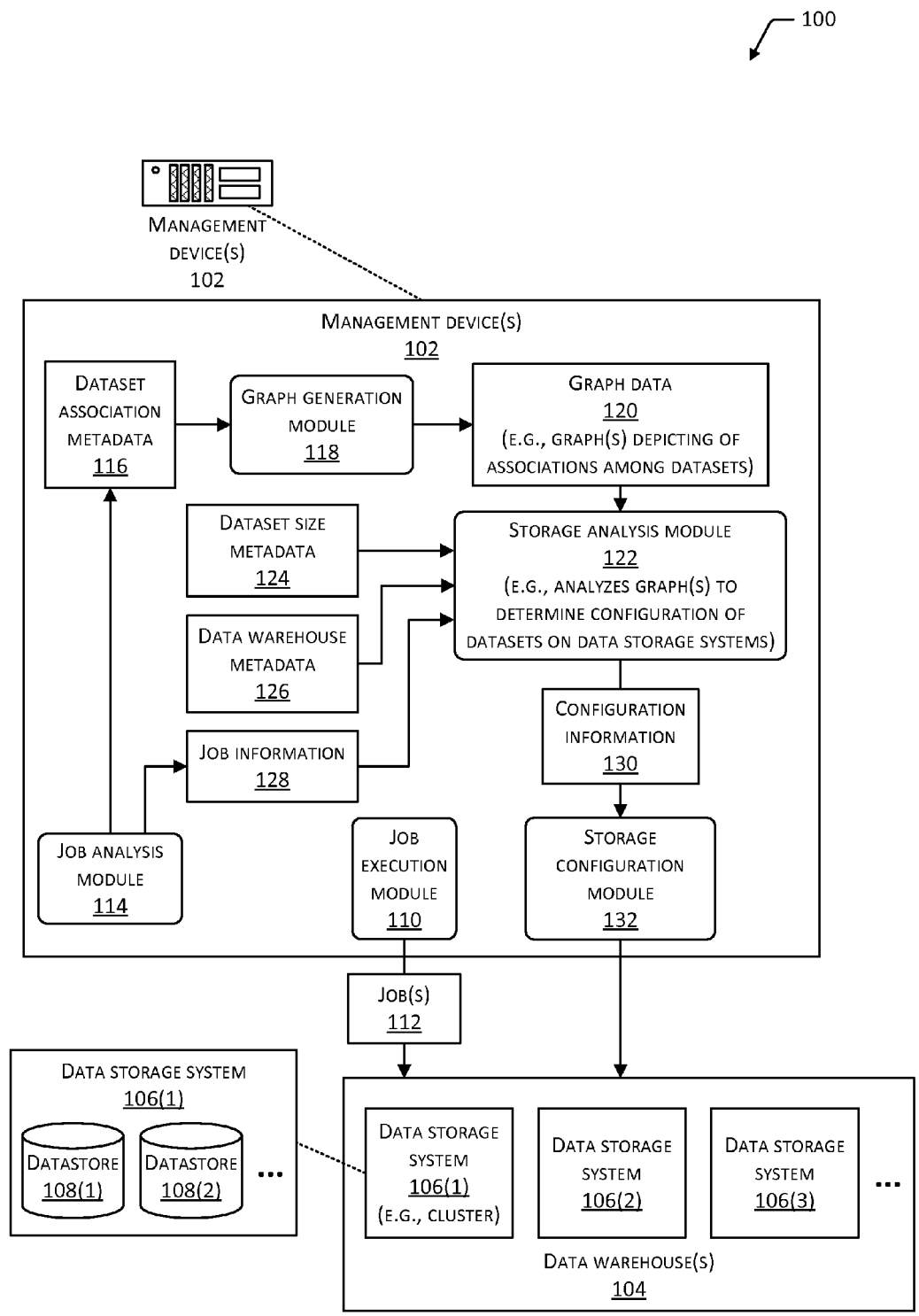
FIG. 1 depicts an environment for performing a graph-based analysis to determine a configuration of datasets stored on a plurality of data storage systems in one or more data warehouses.

FIG. 1 depicts an environment 100 in which implementations may operate. As shown in FIG. 1, the environment 100 may include one or more management devices 102. The management device(s) 102 may comprise any type of computing device, including but not limited to a network computer, a server computer, a mainframe computer, a distributed computing device (e.g., a cloud server), a personal computer, a smartphone, a tablet computer, a wearable computer, an implanted computer, a mobile gaming device, an e-book reader, an automotive computer, a desktop computer, a laptop computer, a game console, a home entertainment device, and so forth. Although examples herein may describe the management device(s) 102 as physical device(s), implementations are not so limited. In some cases, the management device(s) 102 may include one or more of a virtual computing environment, a hypervisor, an emulation, or a virtual machine executing on one or more physical computing devices. In some cases, two or more of the management devices 102 may comprise a cluster, cloud, farm, or other grouping of multiple devices that coordinate operations to provide load balancing, failover support, parallel processing capabilities, shared storage resources, or other aspects. The management device(s) 102 are described further with reference to FIG. 8.

The management device(s) 102 may communicate over one or more networks (not shown) with one or more data warehouses 104. Each of the data warehouse(s) 104 may comprise any number of data storage systems 106. In some cases, the data storage system(s) 106 may include one or more processors or computing devices to perform actions for data storage, retrieval, and modification. Alternatively, the data storage system(s) 106 may be controlled by processors or computing devices that are external to the data warehouse(s) 104. Each of the data storage system(s) 106 may include any number of data storage devices and may provide data storage in any number of datastores 108 that are implemented as software, hardware, or a combination of hardware and software. The data warehouse(s) 104 may store any amount of structured or unstructured data in the datastore(s) 108. In some cases, the amount of stored data may be on the order of exabytes.

The datastore(s) 108 may include any number of relational databases. A relational database may employ a relational storage format including one or more formally described tables, with each table including one or more columns associated with data attributes. The relational database may be managed through any type of Relational Database Management System (RDBMS) software. Relational datastore(s) 108 may include, but are not limited to, databases managed through any version of: Oracle™ and MySQL™ from Oracle Corporation of Redwood City, Calif., United States; DB2™, from International Business Machines (IBM) Corporation of Armonk, N.Y., United States; Linter™, from RELEX Group of Voronezh, Russia;

Microsoft Access™ and Microsoft SQL Server™, from Microsoft Corporation of Redmond, Wash., United States; PostgreSQL™, from the PostgreSQL Global Development Group; or SQLite™, from D. Richard Hipp.

The datastore(s) 108 may also include any number of non-relational datastores 108 that employ a non-relational data storage format that may not comply with a relational database model. In some cases, the non-relational datastore(s) 108 may employ a hierarchical database model or a network database model. The non-relational datastore(s) 108 may also include key-value stores, hash tables, flat files, associative arrays, other types of data structures, or unstructured data storage. Non-relational datastore(s) 108 may include, but are not limited to, datastores managed through any version of: FoxPro™ database management system, from Microsoft Corporation of Redmond, Wash., United States; ParAccel™ Analytic Database from Actian of Redwood City, Calif., United States; or Hadoop™, from the Apache Software Foundation.

The datastore(s) 108 may each support one or more query languages for performing data access operations or administrative operations. For example, a datastore 108 that is managed using the Oracle™ RDBMS may support a version of Procedural Language/Structured Query Language (PL/SQL), whereas a datastore 108 managed through a version of the ParAccel™ Analysis Database may support a different command syntax. As another example, non-relational datastore(s) 108 that implement a version of the Hadoop™ framework may support queries in the Hadoop Query Language (HQL) or MapReduce.

Each of the data storage system(s) 106 may comprise a cluster of any number of the datastore(s) 108. Each of the datastore(s) 108 may be configured to store one or more datasets. A dataset may include any amount of data in any format. In cases where the datastore 108 is a relational database, the dataset(s) may include one or more tables each comprising any number of columns. A dataset may include any number of data records of any size, which include data for any number of data attributes. In cases where the datastore 108 is a relational database, the records may be described as rows.

The management device(s) 102 may execute a job execution module 110 that is configured to execute one or more jobs 112. In some cases, the job(s) 112 may be scheduled to execute one or more times. Alternatively, the job(s) 112 may be launched on the instructions of processes or individuals. The job(s) 112 may each include any number of statements to read, write, modify, delete, or otherwise access the data stored in the datastore(s) 108. The statements may employ a query language supported by the datastore(s) 108. The statements may also be described in a programming language. The programming language may be a scripting language or an interpreted language to be executed within a virtual machine, interpreter, scripting engine, or other software module. For example, the job(s) 112 may be written, at least in part, in JavaScript™, ActiveScript™ VBScript™, Perl™, and so forth. The job(s) 112 may also be written, at least in part, in any compiled programming language such as Java', C, C++, C#™, Objective-C™, and so forth. The job execution module 110 may execute on one or more of the management device(s) 102 that are different than the management device(s) 102 executing other modules shown in FIG. 1.

In some implementations, the management device(s) 102 may execute a job analysis module 114. The job analysis module 114 may monitor one or more of the job(s) 112 during the execution of the job(s) 112 and the job analysis module 114 may analyze the statements executed by the job(s) 112. Alternatively, the job analysis module 114 may operate offline to analyze the statements included the job(s) 112 before or after the execution of the job(s) 112. The job analysis module 114 may parse the statements to identify join statements or other types of statements that operate to combine data from multiple datasets. For each identified join statement, or other type of statement that combines data from multiple datasets, the job analysis module 114 may generate or update dataset association metadata 116 that describes association(s) between pairs of datasets.

For example, a job 112 may include a statement "SELECT * FROM employee JOIN department ON employee.DepartmentID=department.DepartmentID". The job analysis module 114 may parse the job 112 to search for a particular keyword (e.g., "JOIN") or a particular syntax of a join statement. On identifying the join statement, the job analysis module 114 may further parse the statement to determine the two datasets described in the join statement (e.g., the "employee" and "department" tables). The job analysis module 114 may write, to the dataset association metadata 116, information indicating that the two datasets are associated in at least one job 112. An association between two or more datasets may indicate that the datasets are to be stored on a same data storage system 106, thus enabling successful execution of the job(s) 112 that join or otherwise access the multiple datasets.

The job analysis module 114 may be configured to identify any type of join statement, including but not limited to simple joins, cross joins, natural joins, inner joins, right outer joins, left outer joins, or full outer joins. The job analysis module 114 may identify join statements, or other types of statements, that associate a pair of datasets. The job analysis module 114 may also identify statements that associate more than two datasets. In such cases, the job analysis module 114 may indicate, in the dataset association metadata 116, an association between each possible pair of the multiple associated datasets.

The management device(s) 102 may execute a graph generation module 118. The graph generation module 118 may analyze the dataset association metadata 116 and generate graph data 120. The graph data 120 may include a graph of the datasets and associations between datasets described in the dataset association metadata 116. In some cases, the graph data 120 may be stored on the management device(s) 102. Alternatively, the graph data 120 may be generated and processed in active memory instead of, or in addition to, being stored (e.g., persisted) on the management device(s) 102.

Figure 2:
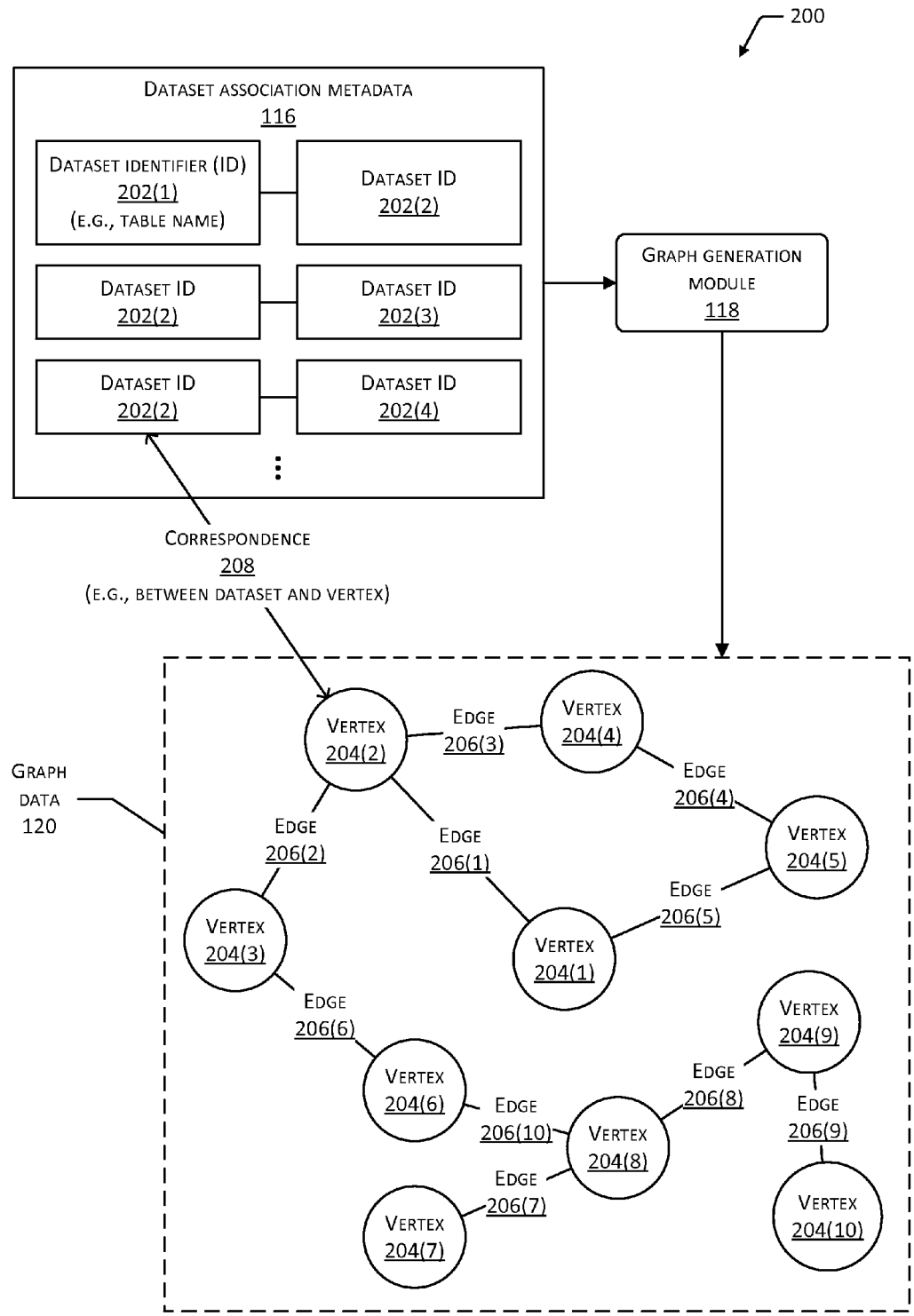
FIG. 2 depicts an example of graph data describing associations among datasets to be stored.

FIG. 2 depicts an example 200 of the dataset association metadata 116 and the graph data 120 generated by the graph generation module 118. As shown in FIG. 2, the dataset association metadata 116 may include any number of records that each indicates an association between two datasets. The association may be indicated as a mapping or other relationship between two dataset identifiers (IDs) 202. Each of the dataset IDs 202 may identify (e.g., uniquely identify) a dataset to be stored in the data warehouse(s) 104. In cases where the dataset is a table to be stored in a relational database, the dataset ID 202 may be a table name.

The graph generation module 118 may analyze the dataset association metadata 116 and generate the graph data 120. As shown in FIG. 2, the graph data 120 may comprise a graph that includes any number of vertices 204 and any number of edges 206. For each of the vertices 204, there may be a correspondence 208 between the vertex 204 and a dataset identified by a dataset ID 202 in the dataset association metadata 116. Each of the edges 206 may connect two of the vertices 204 to indicate an association between the two datasets corresponding to the connected vertices 204.

Returning to FIG. 1, the graph data 120 may be accessed by a storage analysis module 122 executing on the management device(s) 102. The storage analysis module 122 may analyze the graph data 120 in conjunction with other information such as dataset size metadata 124, data warehouse metadata 126, and job information 128. Based on the analysis, the storage analysis module 122 may determine configuration information 130 that describes a configuration of the datasets to be stored on the data storage system(s) 106. The determined configuration may optimize the storage of datasets on the data storage system(s) 106 to maximize the utilized data storage on the data storage system(s) 106. Accordingly, implementations may enable more efficient use the available storage space in the data warehouse(s) 104.

In some implementations, the storage analysis module 122 may perform a graph-based analysis of the graph data 120. The graph-based analysis may include traversing the graph to identify one or more sets of vertices that each corresponds to a set of associated datasets. In some implementations, the traversal of the graph may be a greedy breadth-first traversal of the graph. In a breadth-first traversal algorithm, the vertices 204 at a first level of the graph may be traversed prior to the algorithm proceeding to the vertices 204 at a second level of the graph, and so forth. In some implementations, the breadth-first traversal algorithm is modified to incorporate a greedy, depth-first traversal of the vertices 204 down the edges 206 that connect a top-level vertex 204 to other vertices 204 prior to proceeding to a next top-level vertex 204.

Figure 3:
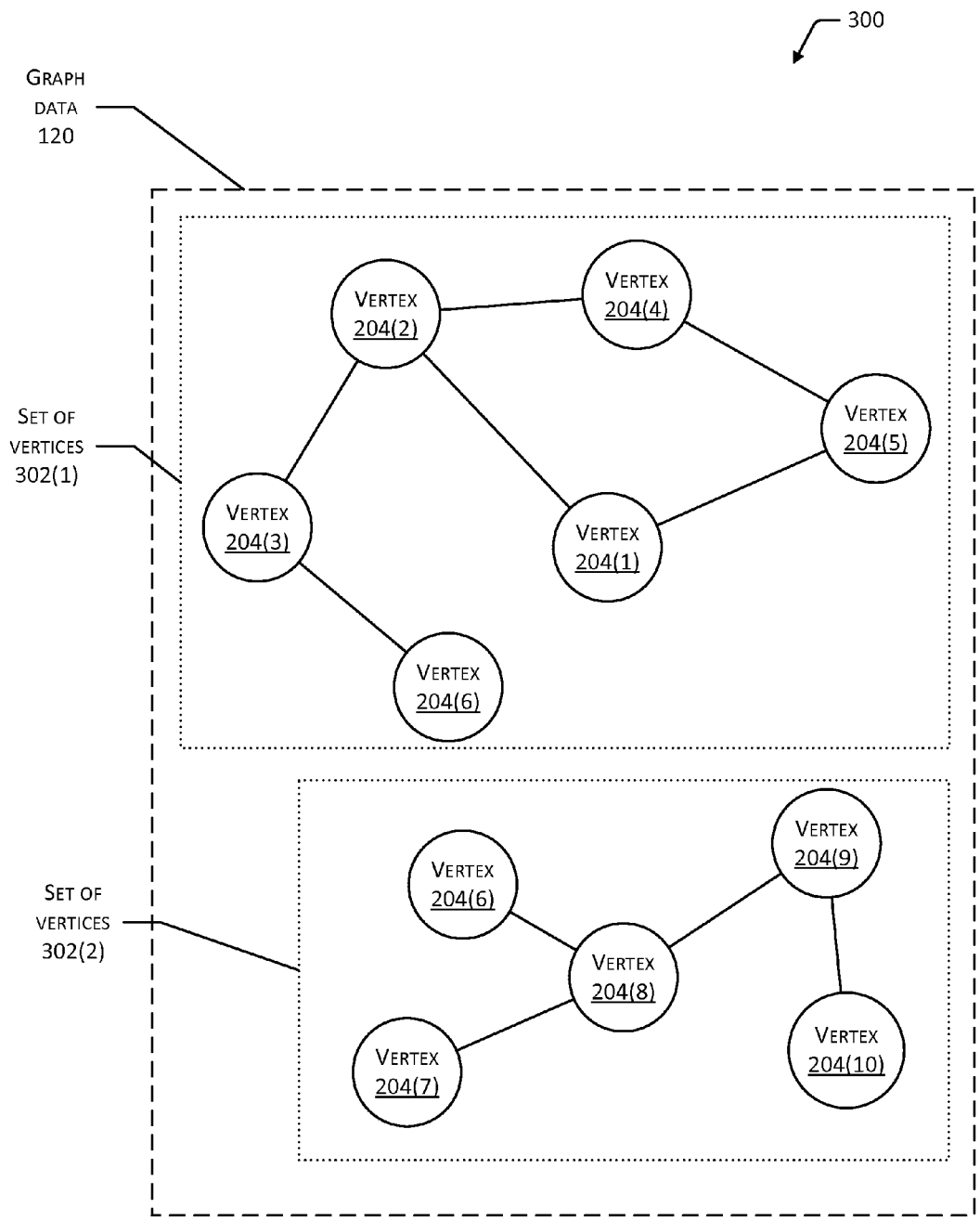
FIG. 3 depicts an example of graph data partitioned into sets of associated datasets, such as through a greedy breadth-first traversal of the graph.

FIG. 3 depicts an example 300 of the graph data 120 partitioned into sets of associated datasets through a greedy breadth-first traversal of the graph. The traversal may begin at a first vertex 204(1). In some cases, the selection of the first vertex 204(1) may be based on the size of the dataset associated with the vertex 204(1). For example, the first vertex 204(1) may be selected based on its correspondence to the largest dataset to be stored in the data warehouse(s) 104, or to one of the largest datasets to be stored. For each vertex 204 connected to the vertex 204(1) directly or indirectly, the algorithm may traverse the graph until reaching a vertex 204 that has no outbound edges 206 such as a leaf or terminal vertex 204, or until reaching a vertex 204 corresponding to a dataset that may not be stored with the other datasets in the set of datasets.

In some implementations, an algorithm may be employed to traverse the graph and, at each vertex 204, determine whether the dataset corresponding to the vertex 204 may be stored on a particular data storage system 106. This determination may be made based on whether the data storage system 106 has a current storage capacity that is sufficient to store the dataset. The determination may also be made based on whether the data storage system 106 has a current processing capacity that is sufficient to execute the jobs 112 that access the dataset. In some cases, the determination may be made based on both storage capacity and processing capacity. If the algorithm determines that the dataset corresponding to a vertex 204 may not be stored on a data storage system 106, the algorithm may discontinue traversing the current set of vertices 302 and designate the previous vertex 204 as a next top-level vertex 204 of a set of vertices 302. The algorithm may then begin traversing the graph from the newly designated top-level vertex 204.

For example, as shown in FIG. 3, the algorithm may traverse the graph beginning at vertex 204(1). For each vertex 204 that is directly or indirectly associated with the vertex 204(1), a determination may be made whether the corresponding dataset may be stored on a data storage system 106(1) based on one or both of the current storage capacity or current processing capacity of the data storage system 106(1). On reaching the vertex 204(8), a determination may be made that the dataset corresponding to the vertex 204(8) may not be stored on the data storage system 106(1) because insufficient storage capacity or processing capacity remains on the data storage system 106(1) after accounting for the resources to be consumed by the first set of datasets corresponding to the first set of vertices 302(1). The algorithm may then partition (e.g., snip) the graph between the vertices 204(6) and 204(8). The vertex 204(6) may be designated as part of a set of vertices 302(1) corresponding to a first set of datasets to be stored on the data storage system 106(1). The algorithm may then begin again traversing the graph from the vertex 204(6) to determine a set of vertices 302(2) corresponding to a second set of datasets to be stored on another data storage system 106(2). In some implementations, the vertex 204(6) may be included in both sets of vertices 302(1) and 302(2), and the dataset corresponding to the vertex 204(6) may be stored on both data storage systems 106(1) and 106(2).

The algorithm may traverse the graph within the set of vertices 302(2) until the storage capacity or processing capacity of the data storage system 106(2) is maximally utilized. The algorithm may then partition the graph again, and begin traversing to determine another set of vertices 302(3). In this way, the traversal may continue until the graph is partitioned into any number of sets of vertices 302, with each set of vertices 302 corresponding to a set of datasets to be stored on a data storage system 106. In some cases, a set of datasets may be determined to be as large as possible within the following constraints: the storage space used by the set of datasets may not exceed the available storage capacity of the data storage system 106; the processing capacity to be used by jobs 112 that access the set of datasets may not exceed the available processing capacity of the data storage system 106; and the set of datasets are associated with one another either directly or indirectly. Each set of vertices 302 may be connected by edges 206 in any topology. The vertices 204 within a set of vertices 302 may be connected directly to one another via a single edge 206. The vertices 204 within a set of vertices 302 may also be connected indirectly to one another via one or more intervening vertices 204 or via two or more intervening edges 206.

A set of vertices 302 may comprise an associative tree of vertices, in which the vertices 204 are directly or indirectly associated with one another. Although examples may describe the set of vertices 302 as an associative tree, the associative tree is not limited to a set of vertices 302 that exhibits a branching topology. In some cases, the associative tree may be a chain of associations among vertices 204, such that each vertex 204 in the set of vertices 302 may be connected to one or two other vertices 204.

Returning to FIG. 1, the storage analysis module 122 may determine, for each set of vertices 302, a set of datasets that correspond to the set of vertices 302. The storage analysis module 122 may determine a utilization metric for each dataset included in a set of datasets. The utilization metric may indicate a weight, impact, or effect of storing the dataset on a data storage system 106. In some implementations, the utilization metric may be a vector or n-tuple that includes any number of values, each value indicating an effect of storing the dataset on a data storage system 106. For example, the utilization metric may include two values that indicate: the amount of storage space used by the dataset; and the amount of processing capacity used by jobs that execute on the data storage system 106 to access the dataset.

Figure 4:
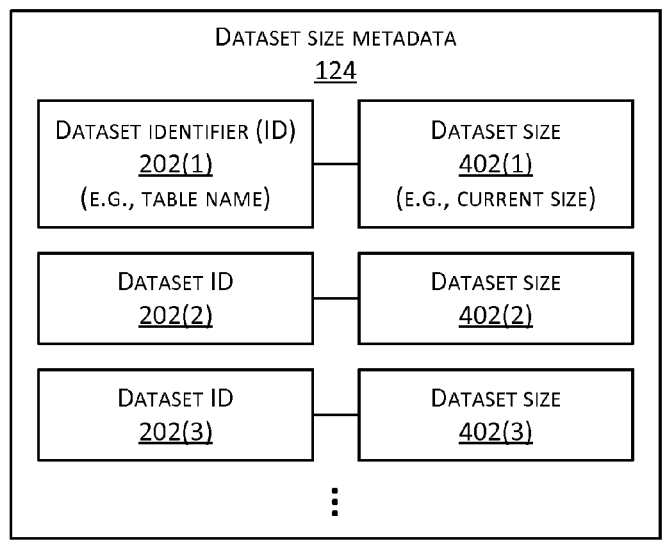
FIG. 4 depicts an example of dataset size metadata describing storage space used by one or more datasets.

In some implementations, the utilization metric of a dataset may be based on the size of the dataset, such as the amount of storage space currently used to store the dataset. The size of a dataset may be described in the dataset size metadata 124. FIG. 4 depicts an example 400 of the dataset size metadata 124 describing the storage space used by one or more datasets. As shown in FIG. 4, the dataset size metadata 124 may include any number of records. Each record may include a dataset ID 202 that identifies a dataset and a dataset size 402 describing the size of the dataset. In some cases, dataset sizes 402 may be measured periodically and the dataset size metadata 124 may be updated accordingly. In some cases, the dataset sizes 402 may describe a recent or current size of the datasets identified by the dataset IDs 202.

Figure 5:
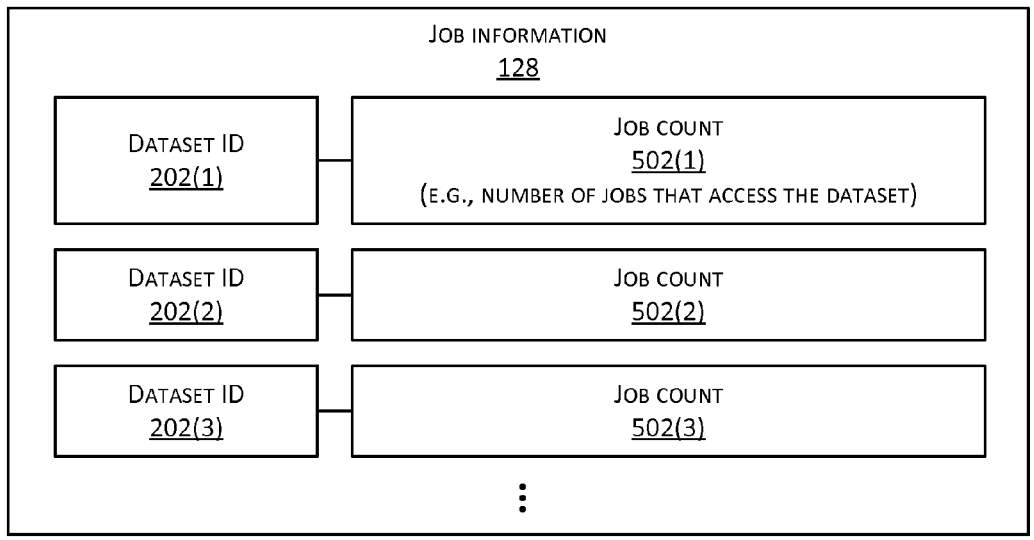
FIG. 5 depicts an example of job information describing a number of jobs that access one or more datasets during execution.

In some implementations, the utilization metric of a dataset may be based on the number of jobs to be executed that access the dataset, indicating a processing capacity that may be consumed on a data storage system 106 that stores the dataset. The number of jobs 112 that access a dataset may be described in the job information 128. FIG. 5 depicts an example 500 of the job information 128 describing a number of jobs 112 that access one or more datasets during execution. As shown in FIG. 5, the job information 128 may include any number of records. Each record may include a dataset ID 202 that identifies a dataset and a job count 502 describing the number of jobs 112 that access the dataset during execution. In some cases, job counts 502 may be measured periodically and the job information 128 may be updated accordingly. In some cases, the job counts 502 may describe a recent or current number of the jobs 112 that have executed, are executing, or are scheduled to execute, to access the datasets identified by the dataset IDs 202. In some implementations, the job information 128 may be determined by the job analysis module 114 as shown in FIG. 1.

Returning to FIG. 1, the storage analysis module 122 may calculate the utilization metric for each of the datasets in a set of datasets corresponding to a set of vertices 302. The utilization metric for a dataset may be based on the dataset size 402, the job count 502, or both the dataset size 402 and the job count 502. In some cases, the utilization metric may be calculated as a mathematical combination of the dataset size 402 and the job count 502. In such cases, the utilization metric may indicate the weight, impact, or effect of storing the dataset on a data storage system 106 with respect to the storage space consumed and the processing capacity utilized to execute jobs 112 that access the dataset.

In some implementations, the storage analysis module 122 may add or otherwise combine the utilization metrics for a set of datasets to determine a combined utilization metric. The combined utilization metric may indicate a weight, impact, or effect of storing the set of datasets on a data storage system 106. Alternatively, the utilization metric may be calculated for each dataset as the graph is traversed, and each dataset may be individually analyzed to determine whether it may be stored on a data storage system 106. In either case, the storage analysis module 122 may employ the data warehouse metadata 126 to identify a data storage system 106 with sufficient resources to store the set of datasets with the combined utilization metric, or to store an individual dataset with a utilization metric.

Figure 6:
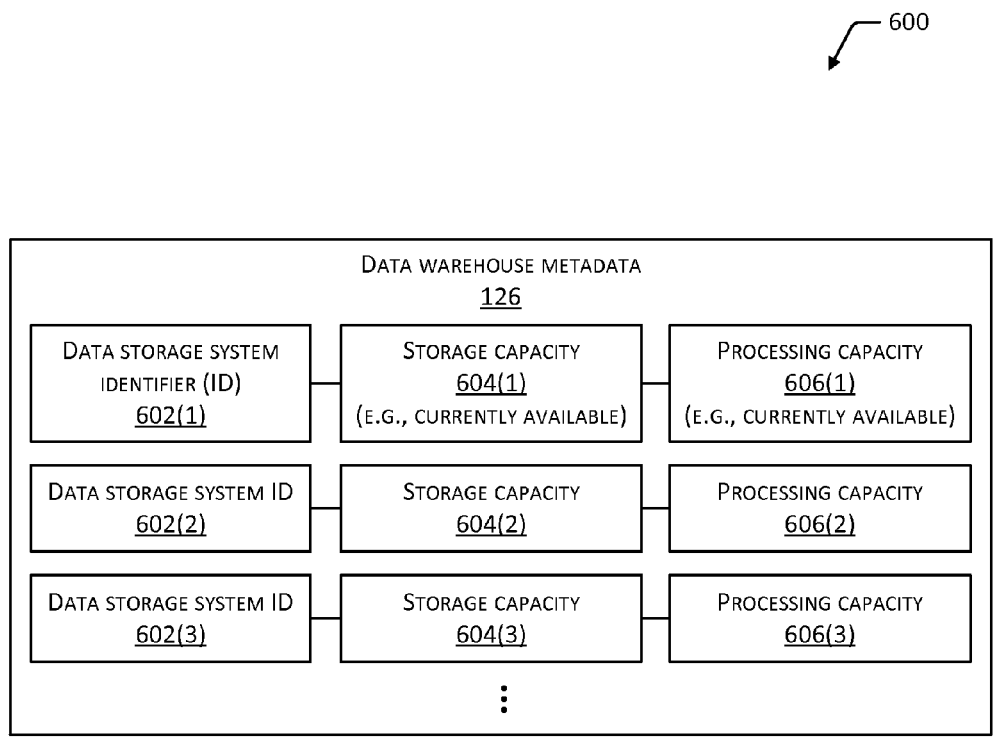
FIG. 6 depicts an example of data warehouse metadata describing storage capacity and processing capacity of data storage systems in one or more data warehouses.

FIG. 6 depicts an example 600 of the data warehouse metadata 126. As shown in FIG. 6, the data warehouse metadata 126 may include any number of records. Each record may include a data storage system ID 602 that identifies a data storage system 106. A data storage system ID 602 may identify (e.g., uniquely identify) a particular data storage system 106 using a host name, a network address such as an Internet Protocol (IP) address, a Uniform Resource Identifier (URI) such as a Uniform Resource Locator (URL) or a Uniform Resource Name (URN), or any other type of ID. In some cases, the data storage system ID 602 may be a name of a cluster of datastores 108. Each record may also include a storage capacity 604 and a processing capacity 606 of the identified data storage system 106. The storage capacity 604 may indicate an amount of available storage space on the data storage system 106, described in any units such as a number of bytes. The processing capacity 606 may indicate the processing power of the data storage system 106 that is available for executing jobs 112. The processing capacity 606 may be described in any units such as a number of available processing cycles or a number of jobs 112 that the data storage system 106 is able to execute. In some cases, the processing capacity 606 may be described as a number of runtime minutes available to execute jobs 112 on the data storage system 106. For example, a data storage system 106 may be characterized by a processing capacity 606 of 1000 runtime minutes during a day, indicating that the data storage system 106 may execute a single job that lasts 1000 minutes, 10 jobs that each lasts 100 minutes, and so forth. The jobs 112 may be executed in parallel or serially on one or more data storage systems 106. In some cases, one or both of the storage capacity 604 or the processing capacity 606 may be measured periodically and the data warehouse metadata 126 may be updated accordingly.

Returning to FIG. 1, the storage analysis module 122 may compare the information in the data warehouse metadata 126 to the combined utilization metric for a set of datasets to identify a data storage system 106 capable of storing the set of datasets. In cases where the combined utilization metric is based on the combined dataset sizes 402 of the set of datasets, the storage analysis module 122 may identify a data storage system 106 with a storage capacity 604 that is at least the combined dataset sizes 402. In cases where the combined utilization metric is based on the combined job counts 502 of the set of datasets, the storage analysis module 122 may identify a data storage system 106 with a processing capacity 606 sufficient to execute a number of jobs 112 that is at least the combined job counts 502. The storage analysis module 122 may analyze any number of sets of datasets to determine a data storage system 106 for each set of datasets. In some cases, the storage analysis module 122 may seek to maximize the utilization of each data storage system 106 with respect to storage capacity 604, processing capacity 606, or both storage capacity 604 and processing capacity 606. Accordingly, implementations may enable more efficient use of storage resources in a data warehouse environment.

Figure 7:
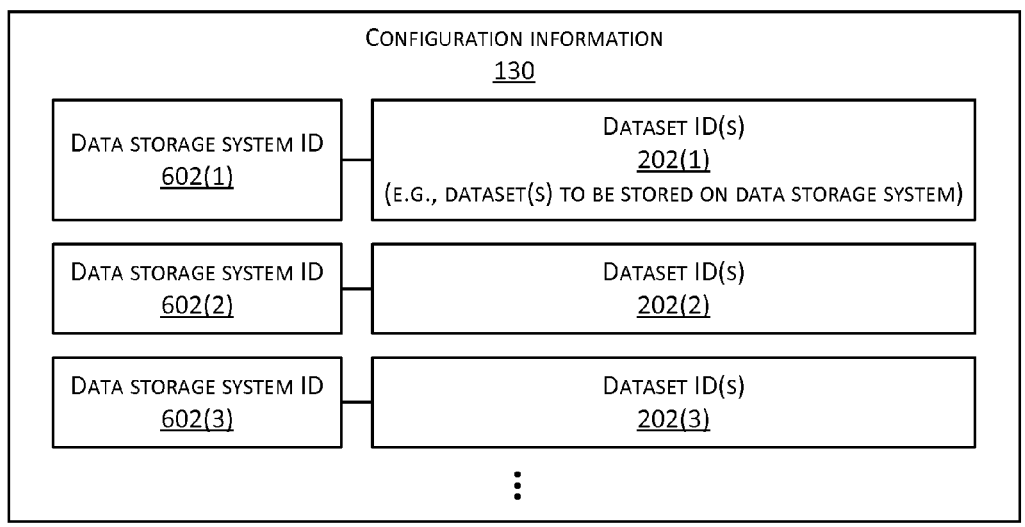
FIG. 7 depicts an example of configuration information describing datasets to be stored on data storage systems in one or more data warehouses.

The storage analysis module 122 may generate configuration information 130 that describes which datasets are to be stored on each of one or more data storage systems 106 in the data warehouse(s) 104. FIG. 7 depicts an example 700 of the configuration information 130. As shown in FIG. 7, the configuration information 130 may include any number of records. Each record may include a data storage system ID 602 that identifies a data storage system 106. Each record may also include a list of one or more dataset IDs 202 indicating the dataset to be stored on the data storage system 106.

Returning to FIG. 1, the configuration information 130 may be accessed by a storage configuration module 132 executing on the management device(s) 102. The storage configuration module 132 may store one or more datasets on one or more data storage systems 106 according to the configuration information 130. In some cases, the storage configuration module 132 may migrate or otherwise move dataset(s) from data storage system(s) 106 where the dataset(s) were previously stored to other data storage system(s) 106 indicated in the configuration information 130. The process for graph-based analysis to determine the configuration information 130 is described further with reference to FIGS. 10 and 11. In some implementations, the graph-based analysis may be performed periodically to re-optimize the use of storage resources in response to changes in the environment 100, such as changes in the executed jobs 112, changes in the number or capacity of the data storage systems 106 available in the data warehouse(s) 104, changes in the datasets to be stored, or other changes.

In some cases, the process for determining the configuration information 130 may be repeated for a plurality of the data storage systems 106, to ensure that each dataset is stored on at least a minimum number of data storage system 106. Such parallel storage may ensure that the dataset(s) are preserved and accessible in the event of the failure of a data storage system 106. For example, each dataset may be present on at least three data storage systems 106 in the data warehouse(s) 104. Moreover, in some cases, the optimization of the storage of datasets on the data storage system(s) 106 may be performed for a subset of the data storage systems 106 in the data warehouse(s) 104. In such cases, one or more data storage system(s) 106 may store all the datasets to ensure that each dataset is available on at least one data storage system 106.

The various devices of the environment 100 may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), mobile communications networks (e.g. 3G, 4G, etc.), and so forth. In some implementations, the communications between the various devices in the environment 100 may be encrypted or otherwise secured. For example, such communications may employ one or more public or private cryptographic keys, ciphers, digital certificates, or other credentials supported by a security protocol, such as any version of the Secure Sockets Layer (SSL) or the Transport Layer Security (TLS) protocol.

Figure 8:
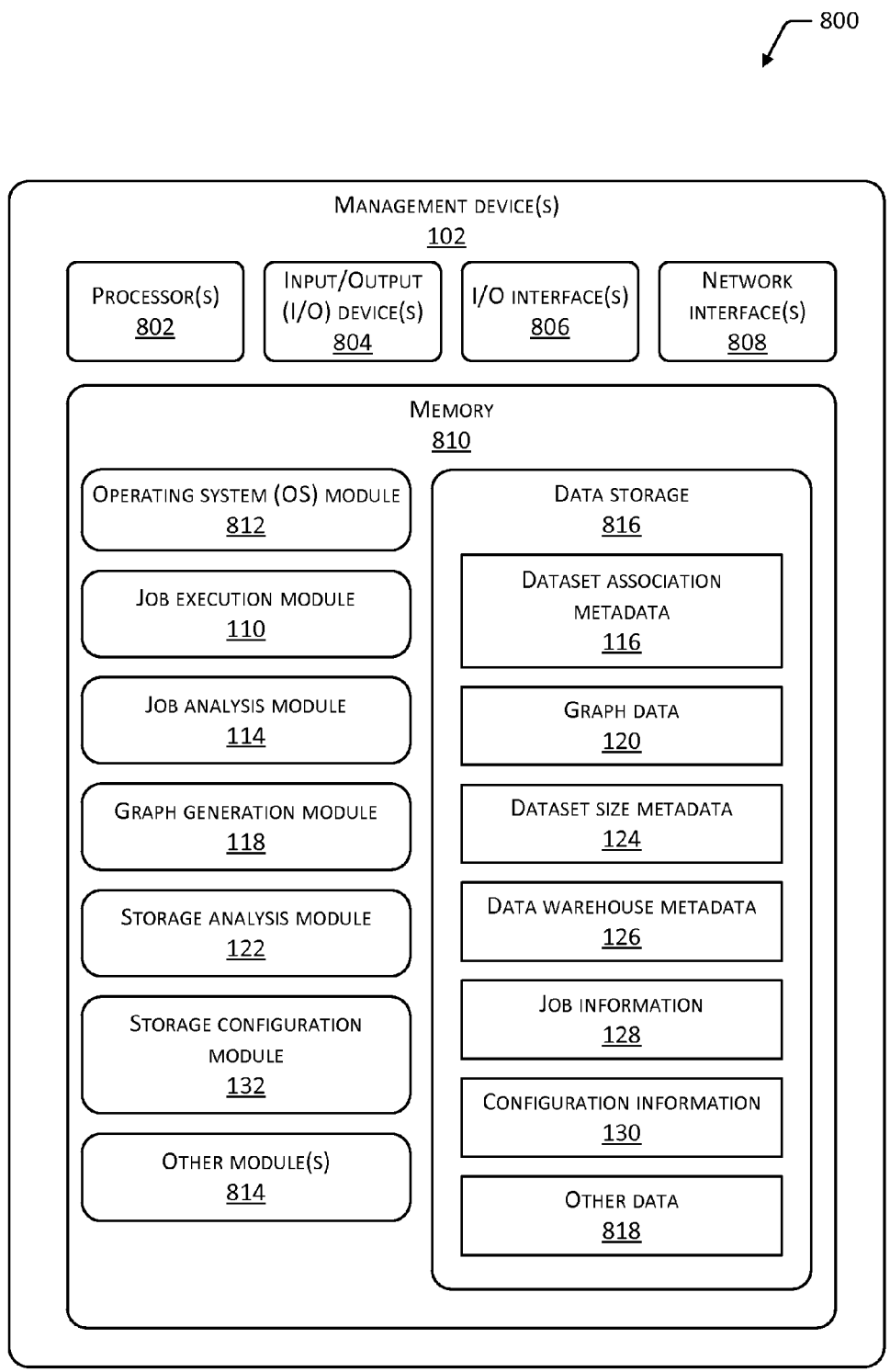
FIG. 8 depicts a block diagram of an example of management device(s) for performing a graph-based analysis to determine a configuration of datasets stored on a plurality of data storage systems in one or more data warehouses.

FIG. 8 depicts a block diagram 800 of an example of the management device(s) 102. As shown in the block diagram 800, the management device(s) 102 may include one or more processors 802 configured to execute one or more stored instructions. The processor(s) 802 may include hardware-based processor(s) 802, and may comprise one or more cores.

The management device(s) 102 may include one or more input/output (I/O) devices 804. The I/O device(s) 804 may include one or more input devices such as a keyboard, a mouse, a pen, a game controller, a touch input device, an audio input device (e.g., a microphone), a gestural input device, a haptic input device, an image or video capture device (e.g., a camera), or other devices. In some cases, the I/O device(s) 804 may also include one or more output devices such as a display, an audio output device (e.g., a speaker), a printer, a haptic output device, and so forth. The I/O device(s) 804 may be physically incorporated with the management device(s) 102 or may be externally placed.

The management device(s) 102 may include one or more I/O interfaces 806 to enable components or modules of the management device(s) 102 to control, interface with, or otherwise communicate with the I/O device(s) 804. The I/O interface(s) 806 may enable information to be transferred in or out of the management device(s) 102 or between components of the management device(s) 102, through serial communication, parallel communication, or other types of communication. For example, the I/O interface(s) 806 may comply with a version of the RS-232 standard for serial ports, or with a version of the Institute of Electrical and Electronics Engineers (IEEE) 1284 standard for parallel ports. As another example, the I/O interface(s) 806 may be configured to provide a connection over Universal Serial Bus (USB) or Ethernet. In some cases, the I/O interface(s) 806 may be configured to provide a serial connection that is compliant with a version of the IEEE 1394 standard. The management device(s) 102 may also include one or more busses or other internal communications hardware or software that enables the transfer of data between the various modules and components of the management device(s) 102.

The management device(s) 102 may include one or more network interfaces 808 that enable communications between the management device(s) 102 and other network accessible computing devices, such as the data storage system(s) 106 included in the data warehouse(s) 104. The network interface(s) 808 may include one or more network interface controllers (NICs) or other types of transceiver devices configured to send and receive communications over one or more networks.

The management device(s) 102 may include one or more memories, described herein as memory 810. The memory 810 comprises one or more computer-readable storage media (CRSM). The CRSM may include one or more of an electronic storage medium, a magnetic storage medium, an optical storage medium, a quantum storage medium, a mechanical computer storage medium, and so forth. The memory 810 provides storage of computer-readable instructions describing data structures, program modules, processes, applications, or other data for the operation of the management device(s) 102. In some implementations, the memory 810 may provide storage of computer-readable instructions or other information in a non-transitory format.

The memory 810 may include an operating system (OS) module 812. The OS module 812 may be configured to manage hardware resources such as the I/O device(s) 804, the I/O interface(s) 806, and the network interface(s) 808. The OS module 812 may also be configured to provide various services to applications, processes, or modules executed by the processor(s) 802. The OS module 812 may include one or more of the following: any version of the Linux™ operating system; any version of iOS™ from Apple Corp. of Cupertino, Calif., USA; any version of Windows™ or Windows Mobile™ from Microsoft Corp. of Redmond, Wash., USA; any version of Android™ from Google Corp. of Mountain View, Calif., USA and its derivatives from various sources; any version of Palm OS™ from Palm Computing, Inc. of Sunnyvale, Calif., USA and its derivatives from various sources; any version of BlackBerry OS™ from Research In Motion Ltd. of Waterloo, Ontario, Canada;

any version of VxWorks™ from Wind River Systems of Alameda, Calif., USA; or other operating systems.

The memory 810 may include one or more of the modules described above as executing on the management device(s) 102, such as the job execution module 110, the job analysis module 114, the graph generation module 118, the storage analysis module 122, or the storage configuration module 132. The memory 810 may also include one or more other modules 814, such as a user authentication module or an access control module to secure access to the management device(s) 102, and so forth.

The memory 810 may include, or have access to, data storage 816 which stores data for operations of the management device(s) 102. The data storage 816 may comprise a file system, database, array, structured list, tree, or other data structure, and may be a relational or a non-relational datastore. The data storage 816 may store any of the information described above as being present on the management device(s) 102, including but not limited to the dataset association metadata 116, the graph data 120, the dataset size metadata 124, the data warehouse metadata 126, the job information 128, or the configuration information 130. The data storage 816 may also store other data 818 such as user authentication information, access control data, or other information. In some implementations, at least a portion of the information stored in the data storage 816 may be stored externally to the management device(s) 102, on other devices that may communicate with the management device(s) 102 via the I/O interface(s) 806 or via the network interface(s) 808.

Figure 9:
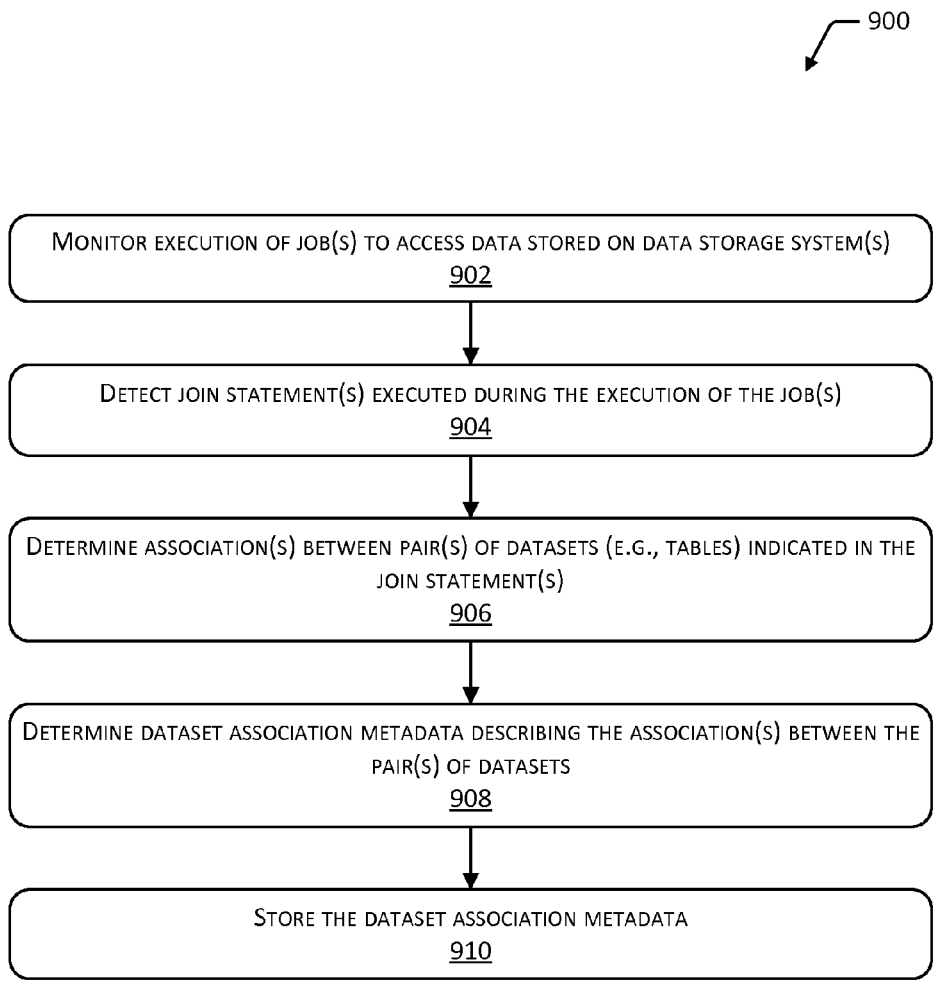
FIG. 9 depicts a flow diagram of a process for determining association metadata describing associations between pairs of datasets.

FIG. 9 depicts a flow diagram 900 of a process for determining the dataset association metadata 116 describing associations between pairs of datasets. Operations of the process may be performed by one or more of the job execution module 110, the job analysis module 114, the graph generation module 118, the storage analysis module 122, the storage configuration module 132, the other module(s) 814 executing on the management device(s) 102, modules executing on the data storage system(s) 106, or other modules executing on other device(s).

At 902, the job analysis module 114 or another module may monitor the execution of one or more jobs 112 that are executed to access data stored on the data storage system(s) 106.

At 904, the job(s) 112 may be analyzed to detect one or more join statements that are executed during the execution of the job(s) 112. As described above, the analysis may parse the statements included in the job(s) 112 to search for a keyword (e.g., JOIN) or a syntactic pattern that corresponds to a join statement. The job(s) 112 may also be analyzed to detect other types of statements that combine or associate multiple datasets.

At 906, one or more associations are determined between one or more pairs of datasets (e.g., tables). The association(s) may be indicated in the join statements or other statements that combine or associate multiple datasets.

At 908, the dataset association metadata 116 is generated or updated to describe the association(s) determined at 906.

At 910, the dataset association metadata 116 may be stored in data storage 816 or elsewhere, and made available for use in the graph-based analysis as described with reference to FIGS. 10 and 11. In some implementations, the determination of the dataset association metadata 116 may be performed as described in U.S. patent application Ser. No. 13/973,324 titled "Query Data Acquisition and Analysis", which was filed on Aug. 22, 2013 and which is hereby incorporated by reference into the present disclosure.

Figure 10:
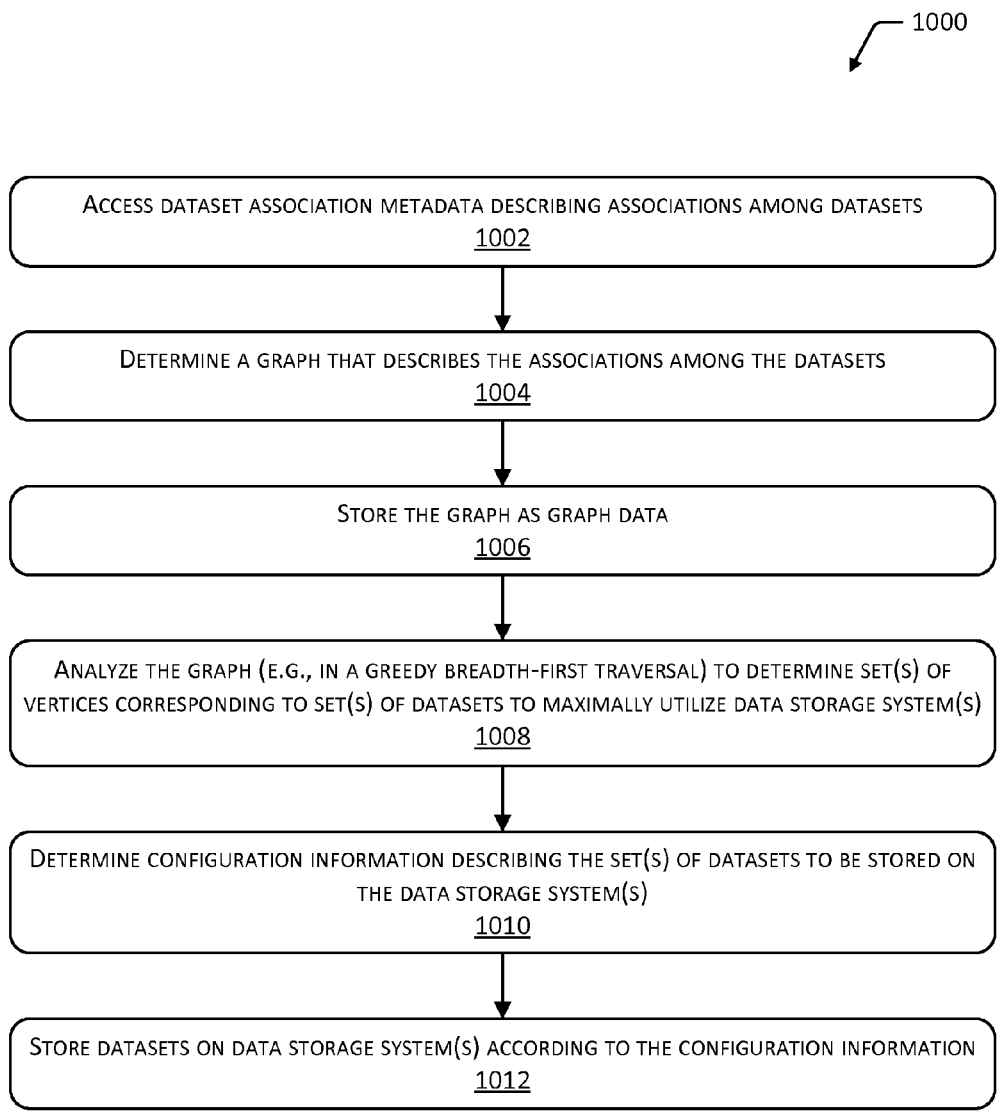
FIG. 10 depicts a flow diagram of a process for graph-based analysis to determine a configuration of datasets stored on a plurality of data storage systems in one or more data warehouses.

FIG. 10 depicts a flow diagram 1000 of a process for graph-based analysis to determine a configuration of datasets stored on a plurality of data storage systems 106 in one or more data warehouses 104. Operations of the process may be performed by one or more of the job execution module 110, the job analysis module 114, the graph generation module 118, the storage analysis module 122, the storage configuration module 132, the other module(s) 814 executing on the management device(s) 102, modules executing on the data storage system(s) 106, or other modules executing on other device(s).

At 1002, the dataset association metadata 116 is accessed. As described above, the dataset association metadata 116 may describe associations among a plurality of datasets, such as one or more pairs of tables that are related through join statement(s).

At 1004, a graph may be determined. As described with reference to FIG. 2, the graph may describe the association(s) among datasets.

At 1006, the graph may be stored (e.g., persisted) as the graph data 120 in the data storage 816 or elsewhere. Alternatively, the graph may be in active memory and processed, in memory, by one or more modules such as the storage analysis module 122.

At 1008, the graph may be analyzed to determine one or more sets of vertices 302 that each corresponds to a set of datasets to be stored on a data storage system 106. In some implementations, the analysis at 1008 may include a greedy breadth-first traversal of the graph to determine sets of datasets that maximally utilize the resources of one or more data storage systems 106, such as one or both of the storage capacity 604 and the processing capacity 606 of the data storage system(s) 106. Such a traversal is described further with reference to FIG. 11.

At 1010, the configuration information 130 may be generated, updated, or otherwise determined to describe the set(s) of datasets to be stored on the data storage system(s) 106.

At 1012, the datasets are stored on the data storage system(s) 106 according to the configuration information 130.

Figure 11:
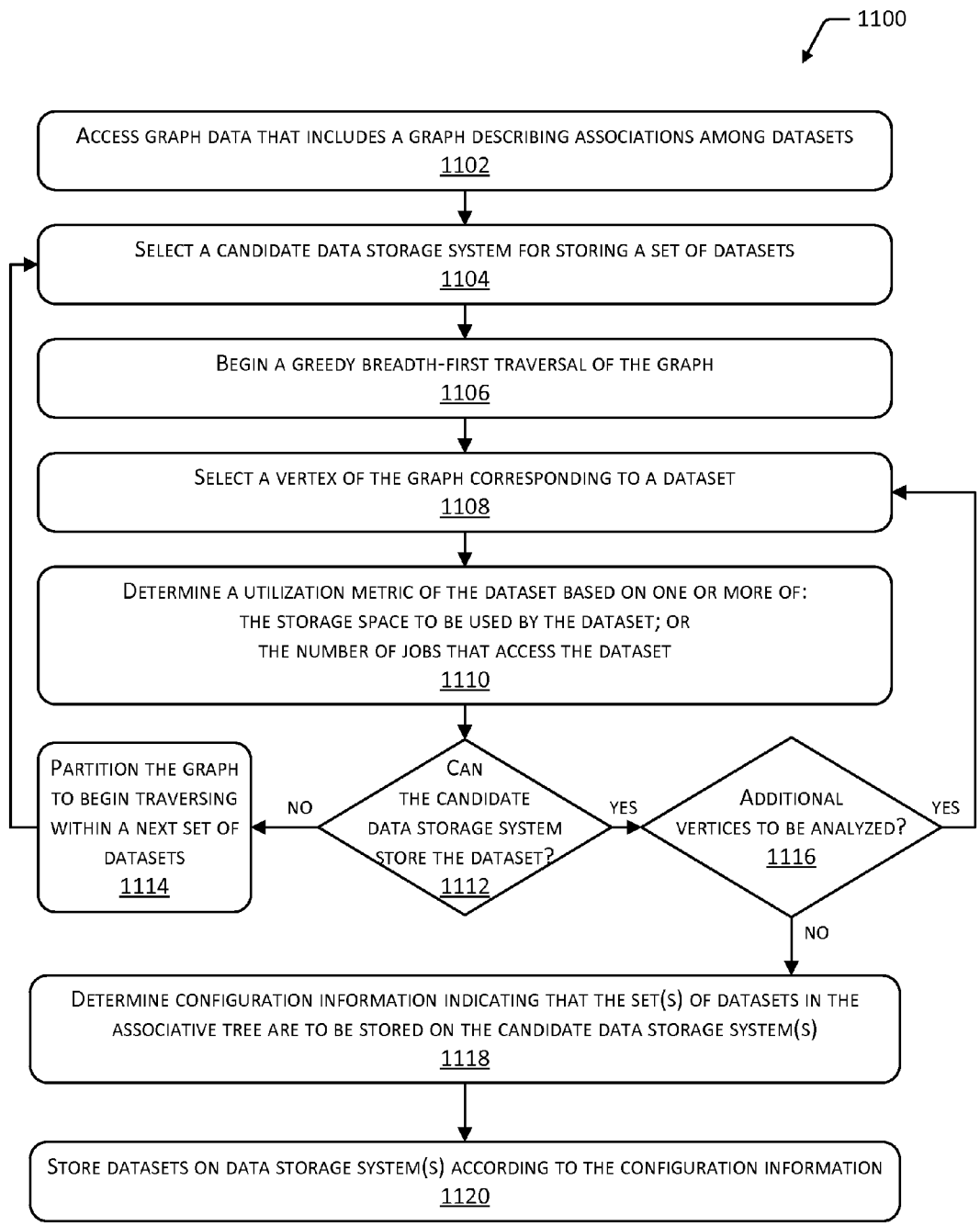
FIG. 11 depicts a flow diagram of a process employing a greedy breadth-first graph traversal to determine a configuration of datasets stored on a plurality of data storage systems in one or more data warehouses.

FIG. 11 depicts a flow diagram 1100 of a process for a greedy breadth-first graph traversal to determine a configuration of datasets stored on a plurality of data storage systems 106 in one or more data warehouses 104. Operations of the process may be performed by one or more of the job execution module 110, the job analysis module 114, the graph generation module 118, the storage analysis module 122, the storage configuration module 132, the other module(s) 814 executing on the management device(s) 102, modules executing on the data storage system(s) 106, or other modules executing on other device(s).

At 1102, the graph data 120 may be accessed. The graph data 120 may describe associations among datasets, and may be generated as described above with reference to FIGS. 9 and 10.

At 1104, a candidate data storage system 106 may be selected. An iteration of the analysis may determine whether the candidate data storage system 106 has sufficient storage capacity 604, processing capacity 606, or both storage capacity 604 and processing capacity 606 to store a set of datasets corresponding to a set of vertices 302 in an associative tree. In some cases, the candidate data storage system 106 may be manually designated. Alternatively, the candidate data storage system 106 may be selected automatically based on one or more characteristics of the data storage system 106, such as its storage capacity 604, processing capacity 606, age, hardware configuration, software configuration, owner, location, and so forth.

At 1106, the process may begin a greedy breadth-first traversal of the graph starting at a starting vertex 204 as described above.

At 1108, during the traversal a vertex 204 of the graph may be selected. The vertex 204 may correspond to a dataset.

At 1110, a utilization metric may be determined for the dataset, where the utilization metric indicates the weight, impact, or effect of storing the dataset on the candidate data storage system 106. As described above, the utilization metric may be calculated based on one or more of the dataset size 402 or the job count 502 of the dataset.

At 1112, a determination is made whether the dataset can be stored on the candidate data storage system 106. The determination may be based on comparing the utilization metric of the dataset to one or both of the storage capacity 604 or the processing capacity 606 of the candidate data storage system 106. For example, the determination may be based on whether the current storage capacity 604 of the candidate storage system 106 is at least the dataset size 402 of the dataset. As another example, the determination may be based on whether the current processing capacity 606 of the candidate storage system 106 is able to accommodate the job count 502 of jobs 112 to be executed that access the dataset.

If it is determined at 1112 that the candidate data storage system 106 is unable to store the dataset, the process may proceed to 1114. At 1114, the graph may be partitioned (e.g., snipped) at the edge 206 connecting the current vertex 204 and the previous vertex 204 as described above with reference to FIG. 3. In this way, a set of vertices 302 may be designated corresponding to a set of datasets that may be stored on the candidate data storage system 106. The previous vertex 204 may be designated as a top-level vertex 204 for another iteration of the analysis. The previous vertex 204 may be included in both the previous set of vertices 302(1) and the next set of vertices 302(2) to be analyzed. The process may then return to 1104 and select a different candidate storage system 106. The process may then restart the graph-based analysis of the next set of datasets starting with the newly designated top-level vertex 204 to determine whether the set of datasets may be stored on the different candidate storage system 106.

If it is determined at 1112 that the candidate data storage system 106 is able to store the dataset, the process may proceed to 1116 and determine whether there are additional vertices 204 to be analyzed in a same associative tree (e.g., in the same set of datasets) in the graph. If so, the process may return to 1108 and traverse the graph to select a next vertex 204 to analyze. If it is determined at 1116 that there are no additional vertices 204 to be analyzed, the process may proceed to 1118.

At 1118, the configuration information 130 may be generated, updated, or otherwise determined to indicate the one or more sets of datasets that are to be stored on one or more candidate data storage systems 106. In some implementations, the configuration information 130 may be generated to describe each set of datasets when the graph is partitioned at 1114.

At 1120, the datasets may be stored on one or more data storage systems 106 according to the configuration information 130. Through operations of the processes described with reference to FIGS. 10 and 11, implementations may ensure that all the datasets in a set of associated datasets are stored on a same data storage system 106, to ensure the successful execution of the job(s) 112 that join or otherwise combine data from the associated datasets.

Those having ordinary skill in the art will readily recognize that certain steps or operations illustrated in the figures above may be eliminated, combined, or performed in an alternate order. Any steps or operations may be performed serially or in parallel. Moreover, the methods described above may be implemented as one or more software programs for a computer system and may be encoded in a computer-readable storage medium as instructions executable on one or more processors.

Embodiments may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, and so forth. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art. It is intended that the present disclosure encompass such changes and modifications that fall within the scope of the appended claims.

What is claimed is:

1. A computer-implemented method, comprising:
accessing dataset association metadata describing associations among tables to be stored on at least one of a plurality of data storage systems, wherein an association between two tables corresponds to a join statement between the two tables, the join statement included in a job to be executed on the at least one of the plurality of data storage systems;
determining a graph that describes the associations among the tables, the graph comprising:
vertices corresponding to individual ones of the tables; and edges connecting pairs of the vertices, wherein an edge corresponds to the association between the two tables;

traversing the graph to determine a set of vertices that are in at least one associative tree;

determining an amount of storage space to be used by a set of tables corresponding to the set of vertices;

determining a data storage system characterized by an available storage capacity that is at least the amount of storage space to be used by the set of tables, the data storage system included in the plurality of data storage systems; and storing the set of tables on the data storage system.

2. The method of claim 1, further comprising:

monitoring a previous execution of the job on the at least one of the plurality of data storage systems;

detecting the join statement executed during the previous execution of the job; and determining the dataset association metadata to describe the association between the two tables indicated in the join statement.

3. The method of claim 1, wherein:

the set of vertices is a first set of vertices;

the set of tables is a first set of tables;

the data storage system is a first data storage system;

the amount of storage space is a first amount of storage space to be used by the first set of tables;

the first set of tables is determined by traversing the graph from a first vertex corresponding to a first table; and the method further comprises:

during the traversing of the graph, determining a second vertex corresponding to a second table, wherein an available storage capacity of the first data storage system is insufficient to store the second table with the first set of tables; and partitioning the graph to determine the first set of vertices not including the second vertex, the first set of vertices corresponding to the first set of tables not including the second table.

4. The method of claim 3, further comprising:

traversing the graph from the second vertex to determine a second set of vertices;

determining a second amount of storage space to be used by a second set of tables corresponding to the second set of vertices;

determining that an available storage capacity of a second data storage system is at least the second amount of storage space; and storing the second set of tables on the second data storage system.

5. The method of claim 1, further comprising:

determining a number of jobs to be executed to access the set of tables corresponding to the set of vertices; and determining the data storage system characterized by an available processing capacity that is sufficient to execute the number of jobs.

6. A system, comprising:

at least one computing device configured to implement one or more services, the one or more services configured to:

access dataset association metadata describing associations among datasets to be stored on at least one of a plurality of data storage systems;

determine a graph that describes the associations among the datasets;

traverse the graph to determine a set of vertices of the graph, the set of vertices included in at least one associative tree;

determine an amount of storage space to be used by a set of datasets corresponding to the set of vertices;

determine a data storage system characterized by an available storage capacity that is at least the amount of storage space to be used by the set of datasets, the data storage system included in the plurality of data storage systems; and store the set of datasets on the data storage system.

7. The system of claim 6, wherein an association between two datasets corresponds to a join statement that references the two datasets, the join statement included in a job to be executed on the at least one of the plurality of data storage systems.

8. The system of claim 7, wherein the one or more services are further configured to:

monitor a previous execution of the job on the at least one of the plurality of data storage systems;

detect the join statement executed during the previous execution of the job; and determine the dataset association metadata to describe the association between the two datasets referenced in the join statement.

9. The system of claim 6, wherein the graph comprises:

vertices corresponding to individual ones of the datasets; and edges connecting pairs of the vertices, wherein an edge corresponds to an association between a pair of the datasets.

10. The system of claim 6, wherein:

the at least one of the plurality of data storage systems employs a relational storage format; and the datasets include at least one table arranged according to the relational storage format.

11. The system of claim 6, wherein:

the set of vertices is a first set of vertices;

the set of datasets is a first set of datasets;

the data storage system is a first data storage system;

the amount of storage space is a first amount of storage space to be used by the first set of datasets;

the first set of datasets is determined by traversing the graph from a first vertex corresponding to a first dataset; and the one or more services are further configured to:

during the traversing of the graph, determine a second vertex corresponding to a second dataset, wherein an available storage capacity of the first data storage system is insufficient to store the second dataset with the first set of datasets;

partition the graph to determine the first set of vertices not including the second vertex, the first set of vertices corresponding to the first set of datasets not including the second dataset;

traverse the graph from the second vertex to determine a second set of vertices;

determine a second amount of storage space to be used by a second set of datasets corresponding to the second set of vertices;

determine that an available storage capacity of a second data storage system is at least the second amount of storage space; and store the second set of datasets on the second data storage system.

12. The system of claim 6, wherein traversing of the graph comprises a greedy breadth-first traversing of the graph.

13. The system of claim 6, wherein the one or more services are further configured to:
 determine a number of jobs to be executed to access the set of datasets corresponding to the set of vertices; and
 determine the data storage system characterized by an available processing capacity that is sufficient to execute the number of jobs.

14. One or more computer-readable media storing instructions which, when executed by at least one processor, instruct the at least one processor to perform operations comprising:
 accessing dataset association metadata describing associations among datasets to be stored on at least one of a plurality of data storage systems;
 determining a graph that describes the associations among the datasets;
 traversing the graph to determine a set of vertices that are in at least one associative tree, the set of vertices corresponding to a set of datasets;
 determining utilization metrics for individual ones of the set of datasets, wherein a utilization metric indicates an effect of storing a dataset on the at least one of the plurality of data storage systems;
 determining a data storage system for storing the set of datasets, the data storage system characterized by one or more of a storage capacity or a processing capacity that is sufficient to accommodate the utilization metrics of the set of datasets, the data storage system included in the plurality of data storage systems; and
 generating configuration information designating the set of datasets to be stored on the data storage system.

15. The one or more computer-readable media of claim 14, wherein the operations further comprise:
 monitoring a previous execution of a job on the at least one of the plurality of data storage systems;
 detecting a join statement executed during the previous execution of the job; and
 determining the dataset association metadata to describe an association between two datasets referenced in the join statement.

16. The one or more computer-readable media of claim 14, wherein:
 the at least one of the plurality of data storage systems employs a relational storage format; and
 the datasets include at least one table arranged according to the relational storage format.

17. The one or more computer-readable media of claim 14, wherein the traversing of the graph comprises a greedy breadth-first traversing of the graph.

18. The one or more computer-readable media of claim 14, wherein the determining the utilization metric for the individual datasets further comprises:
 determining a size of the individual datasets; and
 employing the size to determine the utilization metric for the individual datasets.

19. The one or more computer-readable media of claim 14, wherein the determining the utilization metric for the individual datasets further comprises:
 determining a number of jobs to be executed to access the individual datasets; and
 employing the number of jobs to determine the utilization metric for the individual datasets.

20. The one or more computer-readable media of claim 14, wherein the operations further comprise:
 storing the set of datasets on the data storage system according to the configuration information.

\* \* \* \* \*